United States Patent [19]

Hickok

[11] Patent Number: 4,763,202

[45] Date of Patent: Aug. 9, 1988

[54] TIME DIVISION MULTIPLEX VIDEO RECORDER WITH HIGH RESOLUTION

[75] Inventor: William K. Hickok, Rochester, N.Y.

[73] Assignee: Eastman Kodak Company, Rochester, N.Y.

[21] Appl. No.: 915,486

[22] Filed: Oct. 6, 1986

[51] Int. Cl.⁴ .............................................. H04N 9/80
[52] U.S. Cl. ..................................... 358/319; 358/330
[58] Field of Search ............... 358/310, 319, 320, 330, 358/14, 12

[56] References Cited

U.S. PATENT DOCUMENTS

| | | | |
|---|---|---|---|
| 4,520,401 | 5/1985 | Takahashi et al. | 358/310 |
| 4,618,894 | 10/1986 | Ichinoi | 358/310 |
| 4,626,929 | 12/1986 | Ichinoi et al. | 358/310 |
| 4,628,369 | 12/1986 | Ichinoi et al. | 358/312 |
| 4,661,863 | 4/1987 | Ichinoi | 358/330 |
| 4,677,497 | 6/1987 | Yoshinaka | 358/310 |
| 4,691,245 | 9/1987 | Hickok | 358/310 |

*Primary Examiner*—Donald McElheny, Jr.
*Attorney, Agent, or Firm*—Robert M. Wallace

[57] ABSTRACT

A time division multiplex video tape recorder has a channel for receiving the main portion of an incoming video signal, comprising the luminance signal and horizontal synchronization pulse, and a separate channel for receiving the modulated sub-carrier portion of the video signal, comprising the chrominance signal. The luminance channel includes a signal processor for separating the luminance signal and horizontal synchronization pulse from one another. The signal processor removes the horizontal synchronization pulse from the luminance channel and inserts it into the chrominance channel. The luminance signal of each horizontal video line is time-compressed by itself into a first time segment, while the horizontal sync pulse and the chrominance signal of the same horizontal line are time-compressed together into a second time segment, the two segments being recorded serially within the space of one horizontal line scan period. The removal of the horizontal sync pulse from the luminance channel facilitates a decrease in the time compression ratio of the luminance signal and of the time-compressed luminance bandwidth so as to avoid the magnetic tape-to-head interaction cut-off frequency, thereby providing an improvement in overall image quality.

17 Claims, 6 Drawing Sheets

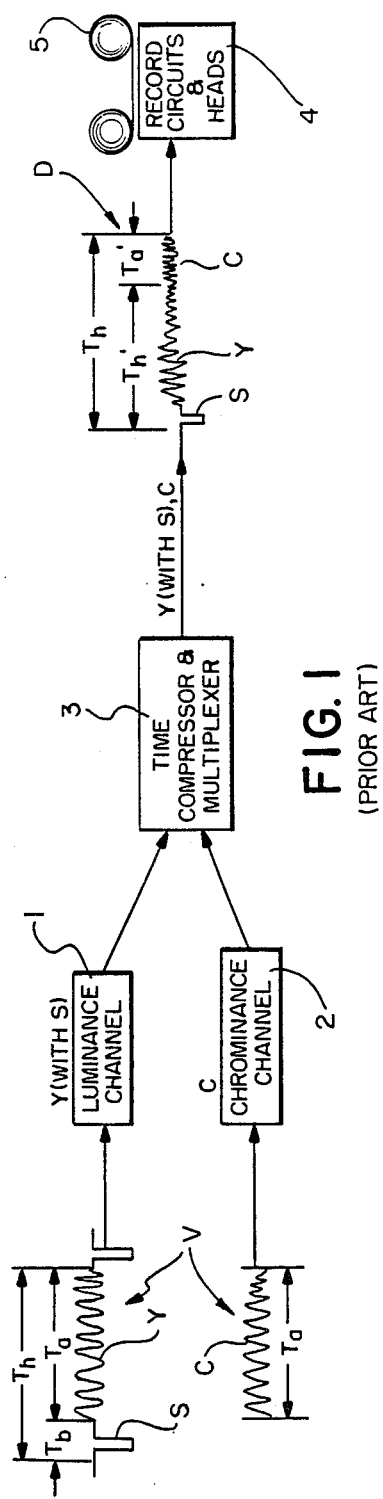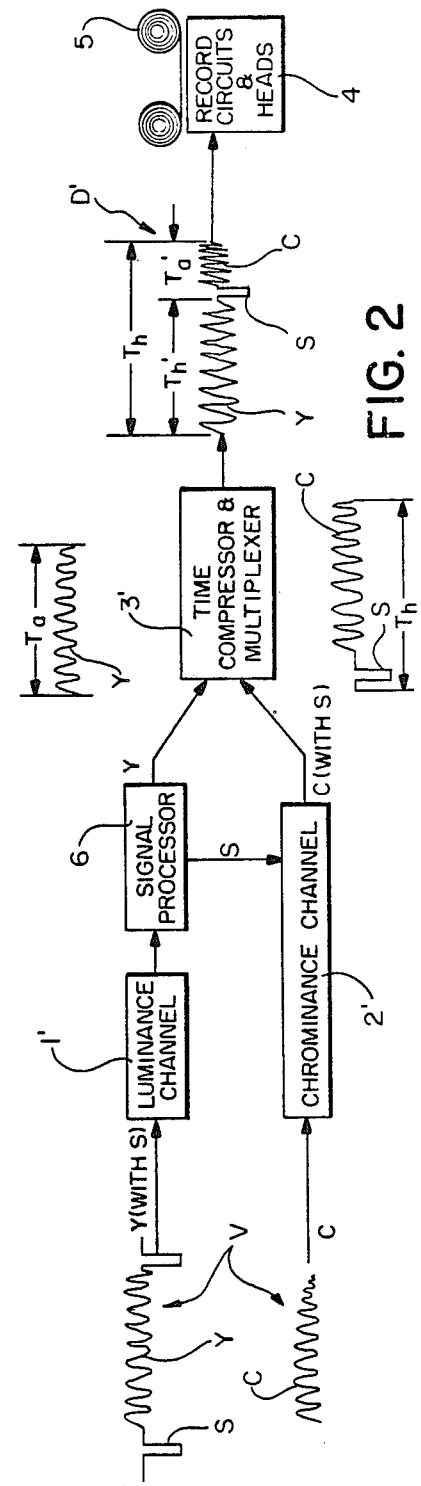

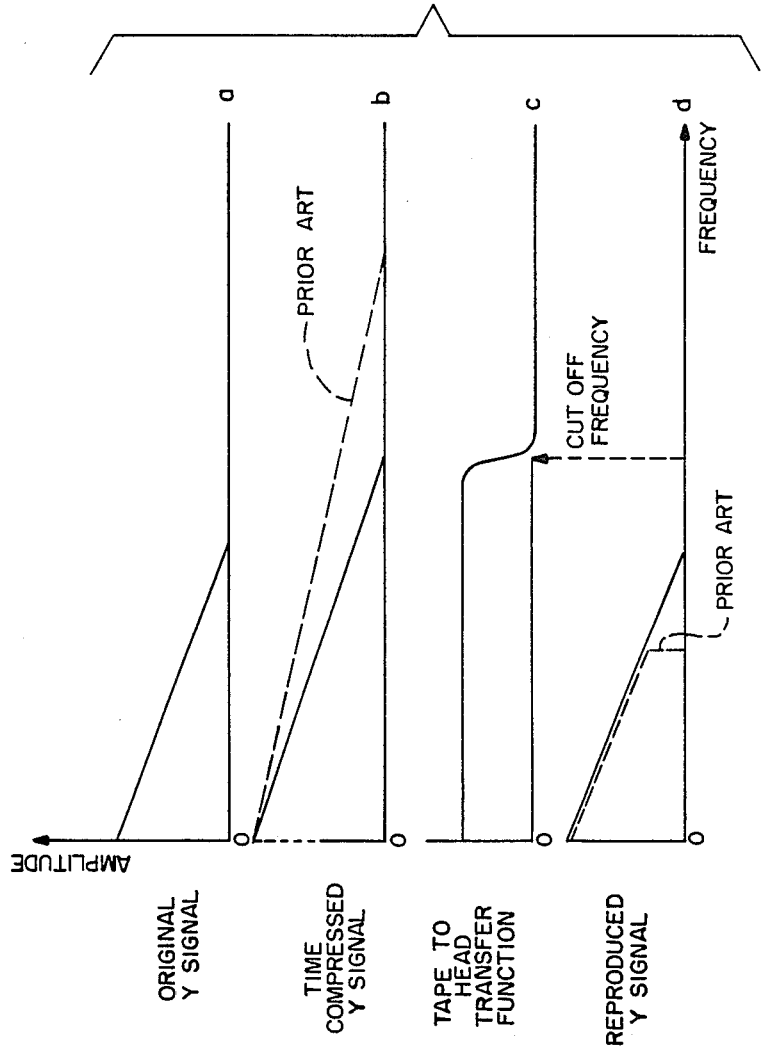

TIME DIVISION MULTIPLEX VIDEO RECORDER WITH HIGH RESOLUTION

BACKGROUND OF THE INVENTION

1. Technical Field

This invention relates to video cassette recorders (VCR's) which record color video signals. In a broadcast video signal, the horizontal synchronization pulse and luminance signal comprise the luminance portion of the video signal, while the chrominance signal and its 3.58 MHz subcarrier comprise the chrominance portion. A VCR includes a filter which separates the luminance and chrominance portions from one another for processing through separate channels.

2. Description of the Related Art

A well-known problem in VCR's is the limited playing time of a video tape cassette. Although the playing time may be increased by reducing the tape speed, the bandwidth and resolution of the resulting playback video signal decreases with the reduction in tape speed, due to the reduced tape-to-head velocity and the high-frequency limitations of video tape recording. A well-known technique for reducing incoming signal bandwidth, to permit recording at slower tape speeds, is to time division multiplex the luminance and chrominance signals of each horizontal line of the incoming video signal into separate time segments (one segment containing the luminance signal and the other segment containing the chrominance signal). Both segments are time compressed in order to fit them serially into one horizontal line scan period. Because the luminance signal contains the most important information (with respect to the resolution of the video image) its time-compression ratio is less, in order to accommodate a higher recorded luminance bandwidth. The less important chrominance signal has a greater compression ratio, typically by about a factor of four. Because the time-compression ratio of the luminance signal is less, its time-compressed recorded bandwidth is less, thus avoiding some luminance high frequency information being cut off by the bandwidth-limiting tape-to-head interaction.

PROBLEM

Nevertheless, image resolution is still at least somewhat limited in proportion to the compression ratio of the luminance signal and the attendant reduction in playback luminance bandwidth (due to the bandwidth limiting tape-to-head interaction). Time compressing the luminance signal forces at least some of its higher frequency information above the cut-off frequency of the tape-to-head interaction, so that it is missing during playback. It would seem the only way to push back this final limitation in resolution is to abandon time division multiplexing altogether and thus forego the accompanying gain in cassette playing time.

Therefore, there is a need to improve video image resolution without surrendering the advantageous increase in video cassette playing time achieved through time division multiplexing.

SUMMARY OF THE INVENTION

Solution to the Problem

In this invention, the advantage of time division multiplexing is preserved, while a significant increase in image resolution is achieved. Apparatus embodying the invention includes a luminance channel and a chrominance channel for receiving the luminance and chrominance signals, respectively, of an incoming video signal. During record operation, a signal processor in the luminance channel separates the luminance signal from the horizontal synchronization pulse, removes each horizontal synchronization pulse from the luminance channel and inserts it into the chrominance channel prior to time compression and multiplexing. The signal to be compressed into the luminance time segment is thereby shortened by a factor of about 1/6 (typically from 63.5 microseconds to 53.5 microseconds). The luminance compression ratio is decreased proportionately, achieving a corresponding decrease in the time compressed luminance bandwidth. This better avoids high frequency cut-off by the bandwidth-limiting tape-to-head interaction. As a result, the decompressed playback luminance signal has a higher bandwidth than was heretofore thought possible in time division multiplex video recorders.

A side effect of this invention is that the time compression ratio of the horizontal synchronization pulse is increased (e.g. by a factor of four) to match the chrominance time-compression ratio. However, this has negligible impact on the playback image quality, because a large bandwidth is not required to reproduce each horizontal synchronization pulse. Furthermore, the fractional increase—1/6—in the chrominance signal compression ratio (necessitated by the addition of the horizontal synchronization pulse to the chrominance channel) has a negligible impact on the playback image resolution, inasmuch as the chrominance signal was already time compressed more than the luminance signal (typically by a factor of four) and is not as important a factor in playback image resolution.

In summary, this invention achieves what heretofore was greatly needed in the prior art, namely an improvement in luminance resolution in time division multiplex video reproducing systems.

DESCRIPTION OF THE DRAWINGS

The invention is best understood by reference to the accompanying drawings, of which:

FIG. 1 illustrates time division multiplexing in accordance with the prior art;

FIG. 2 illustrates the concept of the present invention;

FIG. 3 illustrates the spectrum of an exemplary incoming luminance signal, a time-compressed luminance signal, the reproduced luminance signal and an exemplary tape-to-head transfer function;

DETAILED DESCRIPTION

Prior Art

Figure 4:
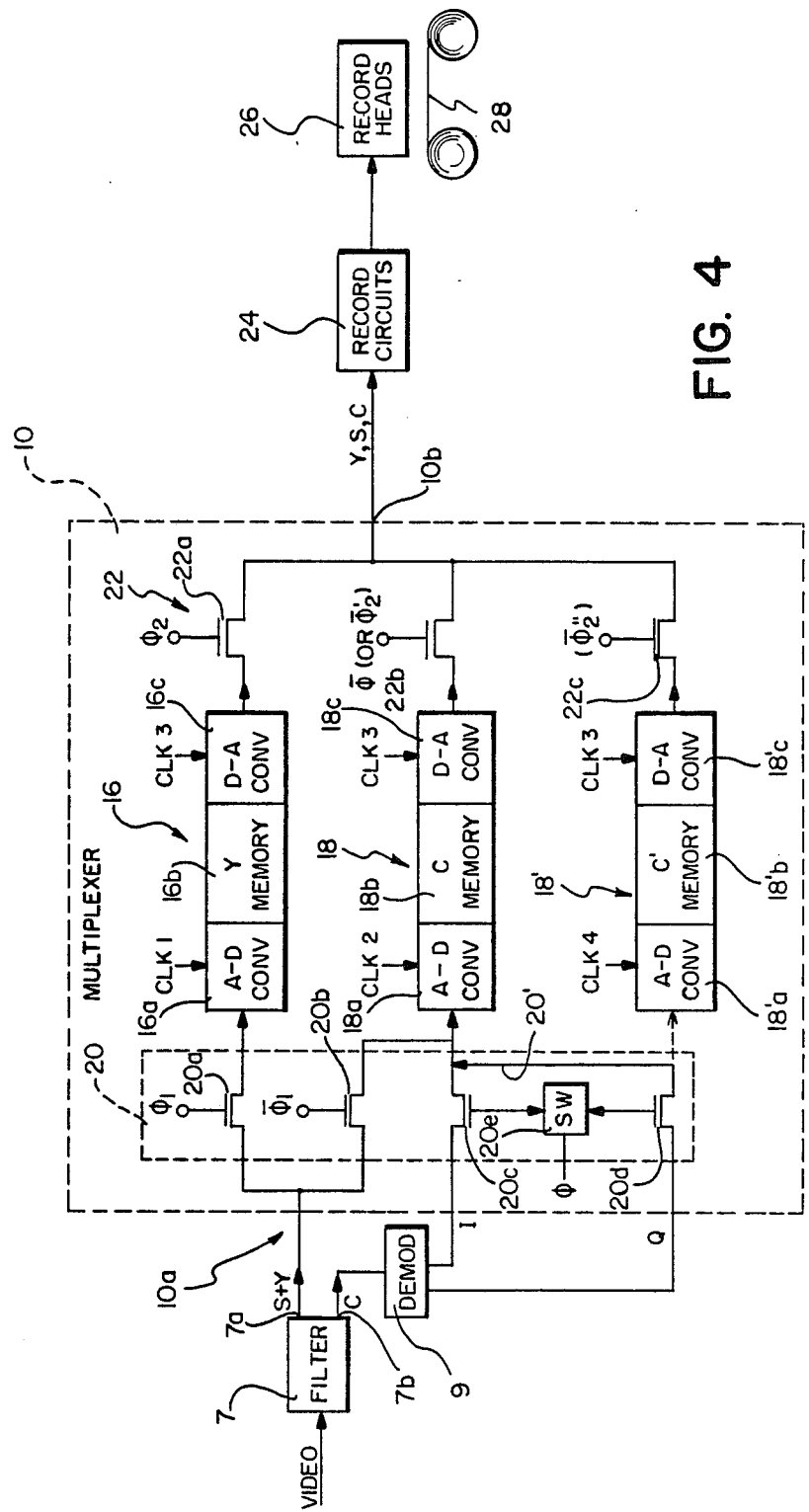
FIG. 4 is a simplified block diagram of an apparatus embodying the invention configured for recording a video signal.

Referring to FIG. 1, a VCR of the prior art receives an incoming video signal V and separates it into a luminance signal Y accompanied by a synchronization pulse S, and a sub-carrier modulating chrominance signal C. The Y signal and S pulse are processed through a luminance channel 1, while the C signal is processed through a chrominance channel 2. The outputs of the luminance and chrominance channels 1, 2 are applied to the inputs of a time-compressor and time division multiplexer 3, whose output is applied to recording heads 4. The compressor/multiplexer 3 generates a time division multiplexed video signal D at its output, which is recorded on a video tape cassette 5. In the incoming video signal V, each horizontal video line occupies a horizontal line scan time period $T_h$, and the horizontal synchronization pulse S occurs during a blanking interval $T_b$, while the luminance and chrominance signals Y and C occur during an active interval $T_a$ within the line scan period $T_h$.

S and Y are time-compressed together by the compressor/multiplexer 3 into a luminance segment which occupies a short time interval $T_h'$, while C is time-compressed into a chrominance segment occupying an even shorter time interval $T_a'$. These two compressed segments are then arranged in serial order by the compressor/multiplexer 3 to form the multiplexed video signal D of FIG. 1. The sum of the compressed intervals $T_h'$ and $T_a'$ corresponds to the horizontal line scan period $T_h$. The luminance interval $T_h'$ is typically about four times longer than the chrominance interval $T_a'$, in order to insure a higher playback bandwidth for the more important luminance signal Y.

Numerous variations on the technique of FIG. 1 are known in the prior art, as described in U.S. Pat. No. 4,163,247 to Bock et al. and U.S. Pat. No. 3,781,463 to Van den Bussche. Other techniques for processing the horizontal synchronization pulse are known but have little relation to time division multiplexing, such as U.S. Pat. No. 3,793,478 to Verhoeven. U.S. Pat. No. 4,005,473 to Hjortzberg, U.S. Pat. No. 4,323,915 to Cezar et al. and U.S. Pat. No. 4,246,599 to Sujimoto et al. disclose various techniques for combining luminance and chrominance, but have little to do with time division multiplexing. Time division multiplexing is also described in U.S. Patent Application Ser. No. 725,873 entitled "Video Reproduction Apparatus" filed Apr. 22, 1985 by Carl Nelson Schauffele and assigned to the present assignee.

The chominance signal is a composite representation of the I and Q color signals (or the R-Y and B-Y color signals). In accordance with known techniques, such as those described in U.S. Pat. No. 4,015,286 to Russell, the I and Q color signals may be alternately sampled to reduce recorded bandwidth, for example. Thus, in some applications, the chrominance channel 14 contains only one signal, either I or Q, at any given time.

LIMITED RESOLUTION

The highest frequency that can be recorded and played back is limited by the cut-off frequency of the magnetic tape-to-head interaction. Time compressing the luminance signal by the ratio $T_h'/T_h$ raises its recorded bandwidth accordingly, thus raising some of the higher frequency luminance information above the tape-to-head interaction cut-off frequency. The bandwidth of the recorded luminance signal is thus cut-off, reducing the playback luminance resolution in proportion to the luminance time-compression ratio $T_h/T_h'$. Although various ratios of $T_h'$ to $T_a'$ may be selected by a skilled worker, the basic requirement—that the sum of $T_h'$ and $T_a'$ can be no greater than $T_h$—imposes a fundamental limitation which has seemed to prevent further improvement in the playback image resolution. In this invention, further improvement in the playback image resolution is achieved despite this seeming limitation.

GENERAL CONCEPT OF THE INVENTION

Referring to FIG. 2, a VCR embodying the invention includes luminance and chrominance channels 1', 2', a time-compressor and time division multiplexer 3', the record heads 4 and a signal processor 6 having its input connected to the luminance channel 1' and its output connected to the chrominance channel 2'. The incoming video signal V is separated into the Y signal (accompanied by the S pulse) and the sub-carrier modulating C signal, the Y signal and S pulse being fed to the luminance channel 1' and the C signal being fed to the chrominance channel 2'.

The signal processor 6 splits each horizontal line of the signal in the luminance channel 1' into portions corresponding to the active and blanking time intervals $T_a$, $T_b$, containing the Y signal and the S pulse, respectively. The signal portion in blanking time interval $T_b$, including the S pulse, is removed by the signal processor 6 from the luminance channel 1' and inserted into the chrominance channel 2', preferably as a temporal prefix to the chrominance signal C of the same horizontal video line.

The combination of the C signal and the S pulse is compressed by the compressor/multiplexer 3' to occupy the chrominance interval $T_a'$. The compressor/multiplexer 3' compresses the luminance signal Y, by itself, into the luminance interval $T_h'$. The result is the time division multiplexed video signal D' of FIG. 2.

The time-compression ratio of the luminance signal is $T_a/T_h'$ (whereas in the prior art it was typically $T_h/T_h'$). Because the active interval $T_a$ is about 53.5 microseconds and the line scan interval $T_h$ is about 63.5 microseconds, the required compression ratio of the luminance signal Y is reduced in this invention by a factor 53.5/63.5 by the removal of the S pulse from the luminance channel 1'. This reduces the time-compressed luminance bandwidth by the same factor, reducing the fraction of the luminance bandwidth exceeding the cut-off frequency of the tape-to-head interaction. The resulting recorded and playback luminance bandwidth is therefore far less subject to being cut-off (by the tape-to-head interaction high frequency losses), thus dramatically improving the playback image resolution.

Referring to FIG. 3, the spectrum of the prior art time-compressed Y signal (FIG. 3b, dotted line) extends beyond the cut-off frequency of the tape-to-head transfer function (FIG. 3c). The resulting playback Y signal of the prior art (FIG. 3d, dotted line) lacks the high frequency portion of the original Y signal (FIG. 3a). In the present invention, the time-compressed Y signal (FIG. 3b, solid line) does not, for the most part, exceed the tape-to-head cut-off frequency. Therefore, in the invention, the spectrum of the playback Y signal (FIG. 3d, solid line) is nearly the same as the spectrum of the original Y signal (FIG. 3a). Thus, playback image resolution is significantly improved over the prior art.

In the example of FIG. 2, the chrominance signal C is compressed roughly four times as much as the luminance signal Y. Adding the horizontal blanking interval $T_b$ (10 microseconds) to the chrominance component C (53.5 microseconds) increases the required chrominance time-compression ratio by 63.5/53.5. This proportionately decreases the playback chrominance bandwidth, due to the high frequency losses of the tape-to-head interaction. However, the chrominance compression ratio was already four times that of the luminance compression ratio in the prior art, and the chrominance signal is less important than the luminance signal in establishing a perceived playback image resolution. Therefore, despite the decrease in playback chrominance bandwidth, there is a significant net gain in playback image resolution in the invention.

Record Operation

A video reproducing system embodying the invention, and configured in the recording mode, is illustrated in FIG. 4. For the sake of simplicity, in the following the description it will be assumed that the incoming chrominance signal C includes only one of its two components, I and Q (or, R-Y and B-Y). A filter 7 receives the incoming composite video signal which is to be recorded and separates the carrier-modulating chrominance portion (C) from the remaining portion (S and Y) of the incoming video signal and produces each portion at its chrominance and luminance outputs 7a, 7b, respectively. A demodulator 9 separates the chrominance signal C from its 3.58 MHz sub-carrier and produces the two base-band signals I and Q (or at least whichever one of the two is present).

A multiplexer 10 receives the luminance signal Y, accompanied by the sync pulse S, (FIG. 5a) and one of the two components, I, Q of the chrominance signal C (FIG. 5b) at its input 10a. The multiplexer 10 generates a time division multiplexed video signal (FIG. 5g) at its output 10b. The multiplexed signal is applied through recording circuits 24 to record heads 26 and recorded on a video tape 28.

The multiplexer 10 includes a luminance time-compressor 16, a chrominance time-compressor 18 and a multiplexing switch 20. The time-compressors 16, 18 each comprise an input analog-to-digital (A-D) converter (16a, 18a), a memory (16b, 18b) and an output digital-to-analog (D-A) converter (16c, 18c), respectively. The multiplexing switch 20 comprises switches 20a, b, c.

Figure 5:
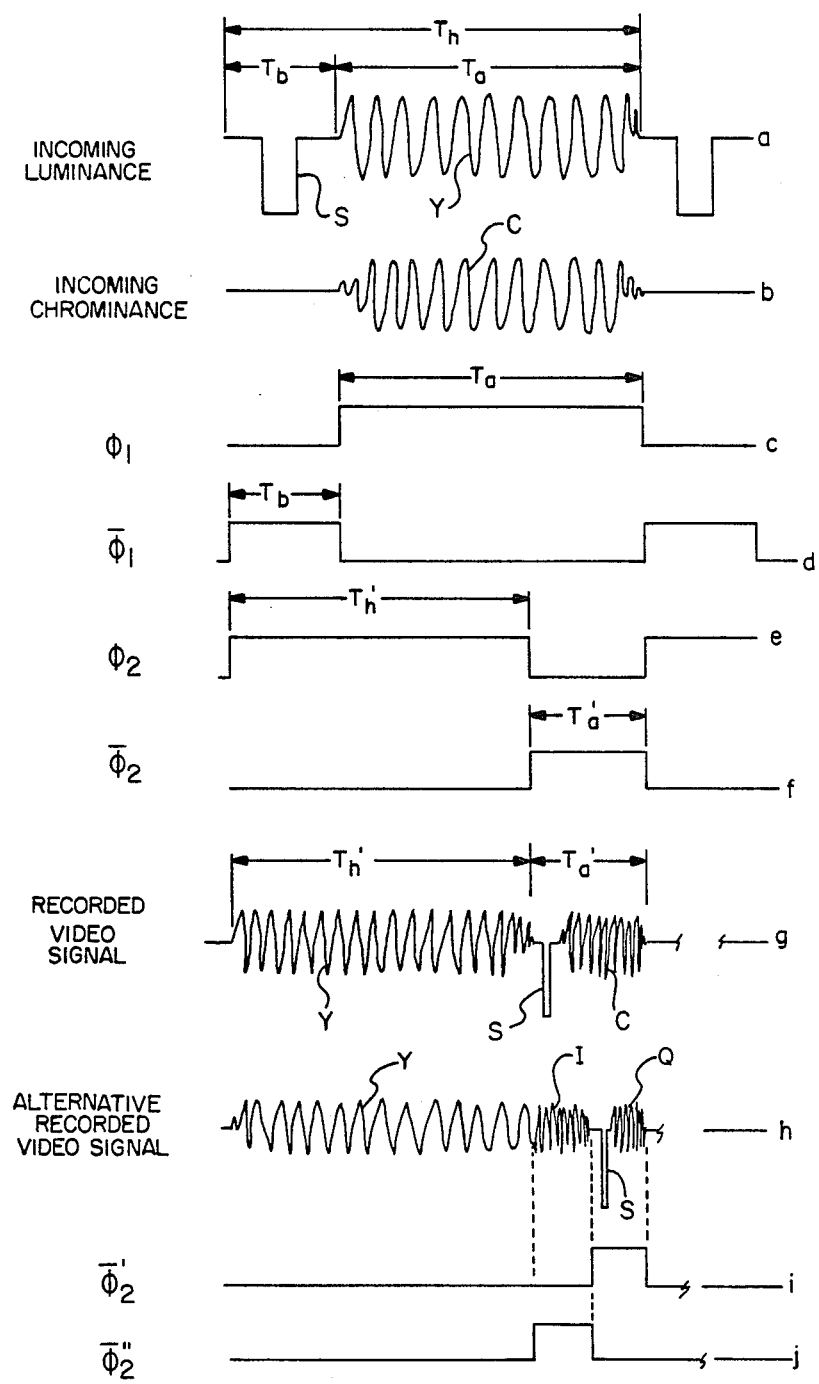
FIG. 5 includes contemporaneous timing diagrams illustrating the operation of the recording apparatus of FIG. 4.

The switch 20a routes the separated luminance signal Y of each horizontal video line to the A-D converter 16a in synchronism with the clock signal $\phi_1$ (FIG. 5c). For each horizontal video line, one of the switches 20c and 20d routes whichever one of the two components I, Q (of the chrominance signal C) is selected to the A-D converter 18a in synchronism with the clock signal $\phi_1$. For this purpose, a switch 20e decides which of the two switches, 20c or 20d, is to be activated by the clock signal $\phi_1$. In a line sequential color system, for example, the switch 20e would change state every horizontal video line. The switch 20e would change state every video field if used in a field sequential color video recording system such as that disclosed in U.S. Application Ser. No. 06/915,486 filed 9-29-86 entitled "TIME DIVISION MULTIPLEX VIDEO RECORDER WITH ENHANCED VERTICAL CHROMINANCE SAMPLING RATE" by William K. Hickok.

Switch 20b separates each sync pulse S from the luminance signal Y and prefixes it to the chrominance signal C of the corresponding horizontal video line in synchronism with the clock signal $\bar{\phi}_1$ (FIG. 5d). During the horizontal blanking interval $T_b$, the switch 20b is closed, routing the sync pulse S from the luminance filter output 7a to the chrominance A-D converter 18a. During the subsequent active time interval $T_a$, the switch 20b is open while the switches 20a and either 20c or 20d are closed, routing the luminance signal Y to the luminance A-D converter 16a and the chrominance signal C to the chrominance A-D converter 18a.

The Y signal and the combination of C and S are converted to digital form by the respective A-D converters 16a, 18a and loaded at nominal data rates (CLK1, CLK2) into the respective memories 16b, 18b. The data stored in the memories 16b, 18b is then read out at a higher data rate (CLK3) in synchronism with the clock signals $\phi_2$, $\bar{\phi}_2$, respectively, (FIGS. 5e, 5f) in order to achieve the requisite time-compression. During the compressed luminance time interval $T_h'$, the switch 22a is closed, routing the compressed luminance signal Y from the memory 16b through the D-A converter 16c to record circuits 24 (for FM modulation, among other things) and record heads 26 for recording on video tape 28. Thereafter, the switch 22a is open. During the subsequent compressed chrominance time interval $T_a'$, the switch 22b is closed, routing the compressed horizontal sync pulse S and chrominance component C from the memory 18b through the D-A converter 16c to the record circuits 24 and the record heads 26 for recording on the video tape 28.

The A-D converters 16a, 18a (from which the memories 16b, 18b are loaded) operate at data rates established by clock signals CLK1, CLK2 respectively. The D-A converters 16c, 18c (through which the memories 16b, 18b are unloaded) operate at the higher (compressed) data rate established by a clock signal CLK3. The ratio between the data rates of the luminance A-D and D-A converters 16a, 16c is $T_a/T_h'$ and is preferably about 1.083. The ratio between the data rates of the chrominance A-D and D-A converters 16a, 18a is $T_h/T_a'$ and is preferably about 4.667. The data rate of the luminance A-D converter 16a is about four times greater than the data rate of the chrominance A-D converter 18a (reflecting the larger number of luminance samples and smaller number of chrominance samples per line).

ALTERNATIVE RECORDER EMBODIMENT

In the foregoing description of the multiplexer 10, the processing of only one of the two components (I and Q) of the chrominance signal C was discussed, for the sake of simplicity. This would suffice, for example, where the I and Q components are alternately sampled so that only one of them is present at the output of the demodulator 9 at any one instant of time (as in line sequential or field sequential color systems, for example).

In case both chrominance components I and Q are to be received simultaneously, the multiplexer 10 is readily adapted to process both chrominance components I and Q simultaneously with the luminance signal Y. This requires the addition of another time compressor 18', including an analog-to-digital converter 18'a, a memory 18'b and a digital-to-analog converter 18'c. In this embodiment, conductor 20' is interrupted, so that the switch 20d is not directly connected to the A-D converter 18a. Instead, the switch 20d is connected to the A-D converter 18a' (through the dashed line conductor). The A-D converter 18'a operates at a data rate defined by a clock signal CLK4, while the D-A converter 18'c operates at the data rate established by the clock signal CLK3. In this embodiment, the switch 20e activates both switches 20c, 20d simultaneously with the clock signal $\phi_1$. The output of the D-A converter 18'c is connected through a switch 22c to the multiplexer output 10b. Furthermore, the clock signal $\overline{\phi}_2$ of FIG. 5f is divided into two clock signals $\overline{\phi}_2'$ (FIG. 5i) and $\phi_2''$ (FIG. 5j). The divided clock signals $\overline{\phi}_2'$, $\overline{\phi}_2''$, synchronize transmission of the compressed chrominance components Q and I, respectively, during successive Q and I time-segments, to the multiplexer output 10a, to generate the alternative recorded video signal of FIG. 5h.

Playback Operation

Figure 6:
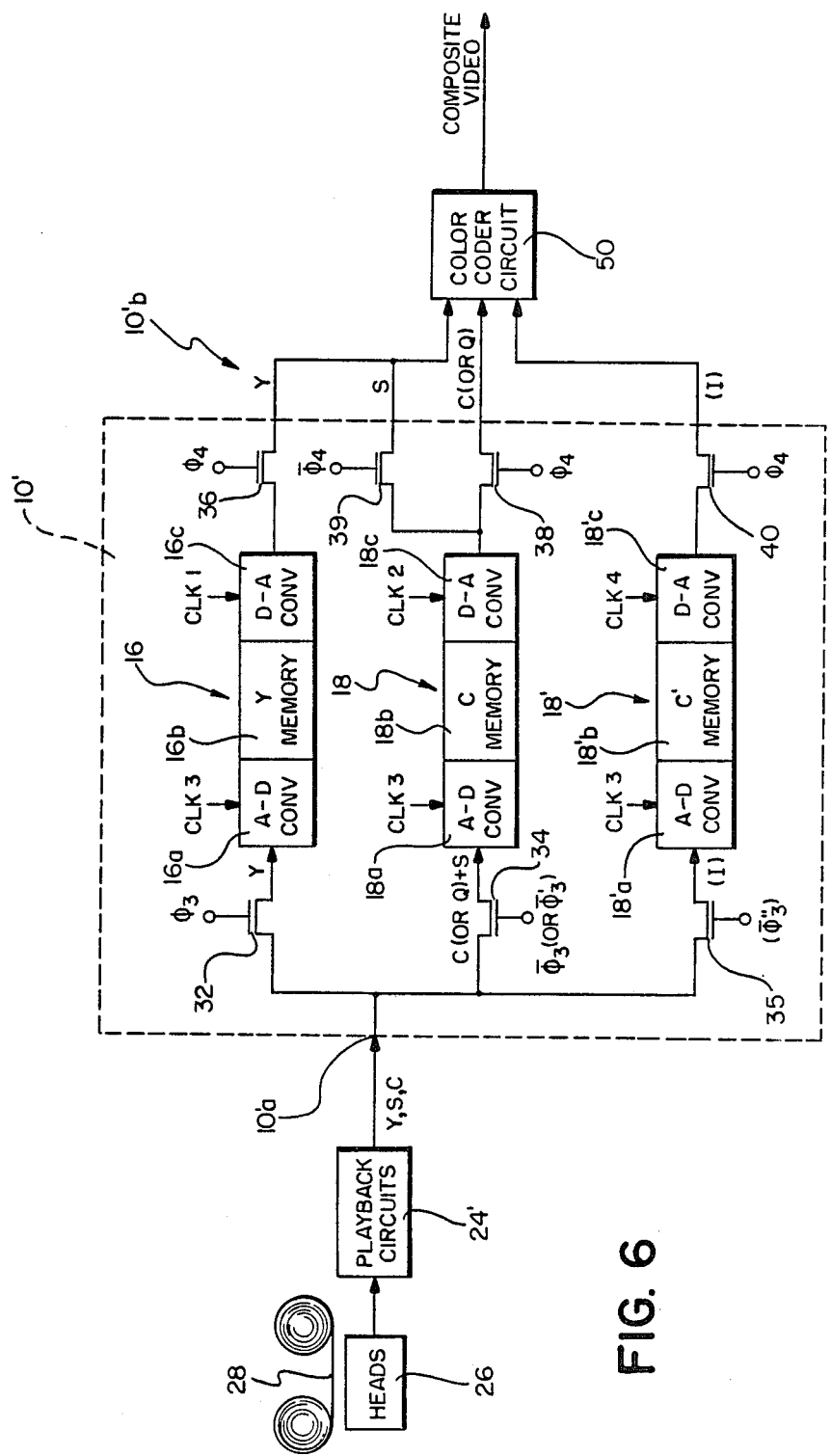
FIG. 6 is a simplified block diagram of an apparatus embodying the invention configured for playing back a video signal previously recorded by the apparatus of FIG. 4.

The video signal of FIG. 5g previously recorded by the apparatus of FIG. 4 may be played back and demultiplexed by the apparatus of FIG. 6. In FIG. 6, the previously recorded video signal is picked up from the video tape 28 by the heads 26 and processed (and FM demodulated) by the circuits 24'. A demultiplexer 10' (which is the same as the multiplexer 10 of FIG. 4 except for some modifications) receives the previously recorded ("playback") video signal (FIG. 7a) at its input 10'a and generates a demultiplexed composite video signal (FIG. 7f) at its output 10'b. Switches 32, 34 control the routing of the playback video signal to the memories 16b, 18b, respectively. Switches 36, 38, 39 route the signals simultaneously unloaded from the memories 16b, 18b. The sync pulses—including the horizontal sync pulse—are contained in the recorded time division multiplexed video signal, and therefore may be extracted and employed to control timing in the manner of the prior art.

The switch 32 extracts the luminance signal Y from the playback signal (FIG. 7a) in synchronism with a clock signal $\phi_3$ (FIG. 7b) and applies it through the A-D converter 16a to the memory 16b. The switch 34 extracts the sync pulse S and the chrominance signal C from the playback signal in synchronism with a clock signal $\overline{\phi}_3$ (FIG. 7c) and applies them through the A-D converter 18a to the memory 18b.

Figure 7:
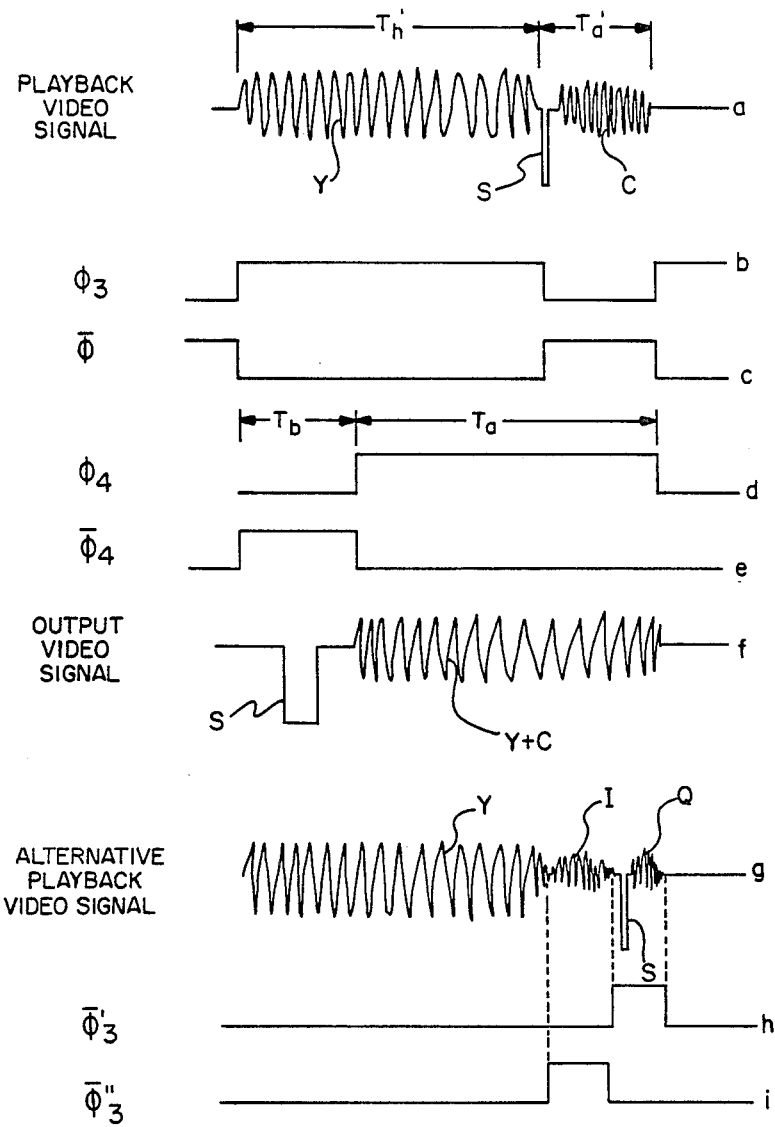
FIG. 7 includes contemporaneous timing diagrams illustrating the operation of the playback apparatus of FIG. 6.

The switch 36 connects the output of the luminance memory 16b (through the D-A converter 16c) to the demultiplexer output 10'b in synchronism with a clock signal $\overline{\phi}_4$ (FIG. 7d). The switch 38 connects the output of the chrominance memory 18b (through the D-A converter 18c) to the demultiplexer output 10'b in synchronism with the clock signal $\phi_4$. The sync pulse S is unloaded from the memory 18b through the switch 39 in synchronism with a clock signal $\overline{\phi}_4$ (FIG. 7e) during the blanking interval $T_b$ while the switches 36, 38 are open. Thereafter, both switches 36, 38 are closed (and the switch 39 is open) during the active interval $T_a$ so that the luminance and chrominance signals, Y and C, are simultaneously unloaded from the memories 16b, 18b, respectively, and combined in a color coding circuit 50 to generate the composite output video signal of FIG. 7f.

The A-D converters 16a and 18a of FIG. 6 operate at the compressed data rate established by the clock signal CLK3. The D-A converter 16c of FIG. 6 operates at the data rate established by the clock signal CLK1. The D-A converter 18c operates at the data rate established by the clock signal CLK2. The ratio between the data rates of the A-D and D-A converters 16a, 16c (or 18a, 18c) is exactly reversed in FIG. 6 from that described previously in reference to FIG. 4.

A skilled worker will easily recognize that each of the switches of FIGS. 4 and 6 may be incorporated into the D-A or A-D converter to which it is connected.

ALTERNATIVE PLAYBACK EMBODIMENT

If the alternative recorder embodiment, described previously in connection with FIG. 4, has been used to record the video signal, then the signal picked up by the playback heads 26' of FIG. 6 corresponds to the alternative playback video signal of FIG. 7g, in which all three component signals Y, I, Q of each video line have been multiplexed into three successive time segments. In order to demultiplex such a signal, the A-D converter 18'a, the memory 18'b and the D-A converter 18'c are added to the demultiplexer 10' of FIG. 6. A switch 35 connects the demultiplexer input 10'a to the input of the A-D converter 18'a. A switch 40, controlled by the clock signal $\phi_4$, connects the output of the D-A converter 18'c to the Y input of the color coding circuit 50. In this embodiment, the clock signal $\overline{\phi}_3$ of FIG. 7c is divided into two clock signals $\overline{\phi}_3'$ and $\overline{\phi}_3''$ of FIGS. 7h and 7i, respectively. The clock signals $\overline{\phi}_3'$ and $\overline{\phi}_3''$ control the switches 34 and 35, respectively, so as to turn these switches on during the respective occurrences of the Q and I signals of the alternative playback signal of FIG. 7g. The A-D converter 18a operates at a data rate established by the clock signal CLK3 and the D-A converter 18'c operates at a data rate established by the clock signal CLK4.

CONCLUSION

Image resolution in time division multiplex video recording is increased by re-arranging the components of each horizontal line of a video signal in a revolutionary manner so as to reduce the time-compression ratio applied to the luminance component prior to recording. This decreases the time-compressed luminance bandwidth, thus avoiding cut-off of the luminance bandwidth by the bandwidth-limiting tape-to-head interaction. As a result, overall playback image resolution is significantly enhanced.

While the invention has been described in detail with particular reference to preferred embodiments thereof, is be understood that variations and modifications thereof may be made within the spirit and scope of the invention.

What is claimed is:

1. A time division multiplex video tape recorder characterized by a bandwidth-limiting tape-to-head interaction cut-off frequency, and adaptable to record an incoming video signal, said video signal including luminance and chrominance signals occurring during an active interval, and a sync pulse prefix appended to said luminance signal and occurring during a blanking interval, said video signal being characterized by a sync repetition period, said recorder comprising:
   means for separating said chrominance signal from the remainder of said video signal including said luminance signal and said sync pulse prefix;
   means for removing said sync pulse prefix from said luminance signal and appending it to said chrominance signal;
   means, characterized by a luminance compression ratio, for time compressing said luminance signal from which said sync pulse prefix has been removed into a first time segment;

means, characterized by a chrominance compression ratio greater than said luminance compression ratio, for time compressing said chrominance signal with said sync pulse prefix into a second time segment, wherein the combined duration of said first and second segments corresponds to said sync repetition period; and means for magnetically recording in succession said first and second segments onto a video tape, whereby said chrominance signal occupies only a portion of said second segment not occupied by said sync pulse prefix and said sync pulse prefix is compressed with said chrominance signal in accordance with said chrominance compression ratio, while said luminance signal occupies the entirety of said first segment, so as to minimize the luminance time-compressed bandwidth whereby to reduce the portion of said time-compressed luminance bandwidth which extends beyond said cut-off frequency.

2. The recorder of claim 1 wherein said chrominance signal comprises I and Q chrominance components, and wherein said chrominance time compressing means time compresses said I and Q chrominance components into separate portions of said second time segment.

3. The video recorder of claim 1 wherein said first segment is longer in time than said second segment so as to further minimize the time-compressed bandwidth of said luminance signal with respect to the time-compressed bandwidth of said chrominance signal.

4. The video recorder of claim 1 wherein said sync prefix removing means comprises:

a separating switch having an input connected to said separating means so as to receive said luminance signal and said sync pulse prefix, and having an ouput connected to said chrominance signal time-compressing means;

means for closing said separating switch contemporaneously with said blanking interval, so as to capture said sync prefix and route it to said chrominance time-compressing means without disturbing said luminance signal, whereby said sync prefix occupies a portion of said second segment period.

5. The video recorder of claim 1 wherein said luminance time-compressing means comprises:

a luminance memory having an input and an output;

luminance memory loading means connected between said filtering means and said luminance memory input;

luminance memory unloading means connected between said luminance memory output and said recording means;

means for enabling said loading means contemporaneously with said active interval and for enabling said unloading means contemporaneously with said first time-compressed segment, whereby said luminance signal occupies, by itself, the entirety of said first segment.

6. The video recorder of claim 5 wherein said chrominance time-compressing means comprises:

a chrominance memory having an input and an output;

chrominance memory loading means connected between said filtering means and said chrominance memory input;

chrominance memory unloading means connected between said chrominance memory output and said recording means; and means for enabling said chrominance memory loading means contemporaneously with said blanking and active intervals and for enabling said chrominance memory unloading means contemporaneously with said second time-compressed segment, whereby said chrominance signal occupies another portion of said second segment which is not occupied by said sync prefix.

7. The video recorder of claim 6 wherein said chrominance memory unloading means unloads said sync pulse prefix from said chrominance memory before it unloads said chrominance signal so that said sync pulse prefix precedes said chrominance signal in said second time-compressed segment.

8. The video recorder of claim 1, further including means for reproducing a video signal previously recorded by said recording means, said reproducing means comprising:

a luminance memory and a chrominance memory;

means for sensing said previously recorded video signal;

means for receiving said first segment from said sensing means and loading it into said luminance memory;

means for receiving said second segment from said sensing means and loading it it into said chrominance memory;

means for unloading said first segment from said luminance memory during a playback active time interval; and means for unloading said second segment from said chrominance memory during a playback horizontal scan period, whereby said sync prefix is unloaded during a playback blanking interval and said chrominance signal is unloaded during said playback active interval simultaneously with the unloading of said luminance signal.

9. A time division multiplex video tape recorder adapted to record an incoming video signal comprising a luminance signal occurring during an active interval of said incoming video signal, a chrominance signal which has been previously separated from said luminance signal and which occurs during said active interval, and a sync pulse occurring during a blanking interval and characterized by a sync repetition period, said recorder comprising:

means for receiving said luminance signal with said sync pulse;

means for receiving said chrominance signal;

means for separating said sync pulse from said luminance signal;

means, characterized by a luminance compression ratio, connected to said luminance signal receiving means for time compressing said luminance signal from which said sync pulse has been separated into a first time segment;

means, characterized by a chrominance compression ratio greater than said luminance compression ratio, connected to said separating means and to said chrominance signal receiving means for time compressing said chrominance signal with said sync pulse into a second time segment shorter than said first time segment, wherein the combined duration of said first and second segments corresponds to said sync repetition period; and means for recording in succession said first and second segments.

10. The video recorder of claim 9 wherein said chrominance signal occupies only a portion of said second segment not occupied by said sync pulse, while said luminance signal occupies the entirety of said first segment, whereby said sync pulse is compressed, with said chrominance signal, in accordance with said chrominance compression ratio, so as to minimize the time-compressed luminance bandwidth.

11. The video recorder of claim 10 wherein said first segment is longer in time than said second segment so as to further minimize the time-compressed luminance bandwidth with respect to the time-compressed chrominance bandwidth.

12. The video recorder of claim 9 wherein said sync pulse separating means comprises:
   a first switch connected between said luminance receiving means and said chrominance time compressing means;
   means for closing said first switch contemporaneously with said blanking interval, so as to capture said sync pulse and route it to said chrominance time compressing means.

13. The video recorder of claim 12 wherein said luminance time compressing means comprises:
   a luminance memory having an input and an output;
   luminance receiving means connected to said luminance memory input;
   a second switch connected between said luminance memory output and said recording means; and
   means for closing said first switch contemporaneously with said active interval and for closing said second switch contemporaneously with said first time compressed segment, whereby said luminance signal occupies by itself the entirety of said first segment.

14. The video recorder of claim 13 wherein said chrominance signal time compressing means comprises:
   a chrominance memory having an input and an output;
   a third switch connected between said chrominance signal receiving means and said chrominance memory input;
   a fourth switch connected between said chrominance memory output and said recording means; and
   means for closing said third switch contemporaneously with said active interval and for closing said fourth switch contemporaneously with said second time compressed segment, whereby said chrominance signal occupies only that portion of said second segment and which is not occupied by said sync pulse.

15. The video recorder of claim 12 or 14 wherein said separating switch is connected between said luminance receiving means and said chrominance memory input, whereby said sync pulse is routed to said chrominance memory before said chrominance signals.

16. The video recorder of claim 9 further comprising means for reproducing a video signal previously recorded by said recording means, said reproducing means comprising:
   a luminance memory and a chrominance memory;
   means for sensing said previously recorded video signal;
   means for receiving said first segment from said sensing means and loading it in said luminance memory;
   means for receiving said second segment from said sensing means and loading it in said chrominance memory;
   means for unloading said first segment from said luminance memory during a playback active time interval;
   means for unloading said second segment from said chrominance memory during a sync repetition period, whereby said chrominance signal is unloaded from said chrominance memory output during said playback active interval simultaneously with the unloading of said luminance signal from said luminance memory output; and
   means connected to said means for unloading said luminance and chrominance signals for combining said unloaded luminance and chrominance signals and said sync pulse into a playback composite video signal.

17. The video recorder of claim 8 or 16 wherein said luminance memory and chrominance memory are comprised within said luminance compressing means and said chrominance compressing means, respectively.

* * * * *